United States Patent [19]

Ohya et al.

[11] 4,416,709
[45] Nov. 22, 1983

[54] AMORPHOUS MAGNETIC ALLOY MATERIAL

[75] Inventors: Kazuo Ohya, Chiba; Hiroki Fujishima, Sakura; Norio Ishijima, Higashimurayama; Hiroyoshi Itoga, Ichikawa; Yasuhiko Kominami, Yachiyo, all of Japan

[73] Assignee: TDK Electronics Co., Ltd., Chiba, Japan

[21] Appl. No.: 300,921

[22] Filed: Sep. 10, 1981

[30] Foreign Application Priority Data

Sep. 15, 1980 [JP] Japan ................... 55-127568

[51] Int. Cl.$^3$ ............................ C22C 19/00
[52] U.S. Cl. .................. 148/403; 420/440; 420/583; 420/584; 420/585; 420/586; 148/31.55
[58] Field of Search ............ 148/31.55, 31.57, 403; 75/171; 420/436, 437, 438, 439, 440, 583, 584, 585, 586, 588

[56] References Cited

U.S. PATENT DOCUMENTS

| | | | |
|---|---|---|---|
| 4,052,201 | 10/1977 | Polk et al. ......................... | 75/122 |
| 4,067,732 | 1/1978 | Ray ................................... | 75/122 |
| 4,079,430 | 3/1978 | Fujishima et al. ............... | 148/31.57 |
| 4,187,128 | 2/1980 | Billings et al. .................. | 148/121 |
| 4,188,211 | 2/1980 | Yamaguchi et al. ............. | 75/171 |
| 4,225,339 | 9/1980 | Inomata et al. .................. | 75/122 |

FOREIGN PATENT DOCUMENTS 2924280  1/1981  Fed. Rep. of Germany.
56-75542  6/1981  Japan.

OTHER PUBLICATIONS

The Condensed Chemical Dictionary, 8th ed., 1971, p. 213.
Zairyo Kagakw (Material Science) 15(4), 1978, pp. 207-214.

Primary Examiner—John P. Sheehan
Attorney, Agent, or Firm—Burgess, Ryan & Wayne

[57] ABSTRACT

The present invention relates to an amorphous magnetic alloy material suited for use as a core material of a magnetic head.

When the magnetic head is subjected to a slide contact with a magnetic tape over a long period of time, a film of oxide and the like is formed on the surface of an amorphous magnetic alloy material due to chemically corrosive media frequently contained in the magnetic coating layer of the magnetic tape or due to carbon dioxide, water and the like contained in the air.

The amorphous magnetic alloy material of the present invention is highly corrosion resistant due to the combination of chromium and platinum family element(s), and, the inconveniences in a magnetic head, due to chemical wear, can be prevented even where the magnetic head is operated or stored in a considerably severe condition.

13 Claims, 1 Drawing Figure

AMORPHOUS MAGNETIC ALLOY MATERIAL

The present invention relates to an amorphous magnetic alloy material and more particularly to an amorphous magnetic alloy material suited for use as a core material of a magnetic head.

The amorphous magnetic alloy material has attracted attention as the core material of a magnetic head, because it exhibits excellent soft magnetic properties, high electric resistance and good workability. Research for practical application of the amorphous magnetic alloy material as the core material of a magnetic head is being actively conducted. In this research, it is deemed that the passivation film formed on the amorphous material, which is free from the crystal defects and which has a solid solution structure of a chemically uniform phase, is satisfactorily resistant against corrosion. Contrary to this, inconveniencies may be brought about, when the magnetic head is manufactured by using conventional amorphous magnetic alloy materials. This is because the use of the amorphous magnetic alloy material as the component material of a magnetic head involves special problems explained hereinafter.

Chemical wear, which occurs particularly in a contact type magnetic head, is a typical example of the inconveniencies mentioned above. When a magnetic head is subjected to a slide contact with a magnetic tape over a long period of time, a film of oxide and the like is formed on the surface of an amorphous magnetic alloy material due to chemically corrosive media frequently contained in the magnetic coating layer of the magnetic tape or due to carbon dioxide, water and the like contained in the air. This film of oxide and the like is peeled off from the surface of an amorphous magnetic alloy material, when such film is subjected to stress generated because of the sliding of the tape or to the grinding effect of the magnetic powder. When chemical wear is the predominant reason which causes the wearing of an amorphous magnetic alloy material, the worn surface exhibits a mirror state. In addition, the sliding contact surface of a magnetic head is eccentrically worn out, with the consequence that the output and input levels of the magnetic head at a high frequency are decreased. From the standpoint of mechanical wear, in which the sliding contact surface of the magnetic head is mechanically ground, after having sliding contact with a tape for a long time, chemical wear is distinguished by the fact that amorphous magnetic alloy materials having equivalent hardness values to one another may be worn out in amounts different from one another depending upon the composition thereof. Mechanical wear is caused by the grinding particles which are generated from both magnetic head and tape by the sliding contact of the magnetic head with a tape and which grinds the sliding contact surface of the magnetic head. When the mechanical wear is the predominant reason which causes the wear of an amorphous magnetic alloy material, a number of scratches are formed on the worn surface by the generated grinding particles. When the mechanical wear is the predominant reason which causes the wear of magnetic head, the number of the scratches usually correspond to that of the generated grinding prticles. Mechanical wear can be remarkably decreased by using a hard material as the component of a magnetic head.

It is known in the field of magnetic recording that an amorphous magnetic alloy material containing at least iron and cobalt of the iron family element, the amount of which iron is from approximately 4 to 7 atomic % based on the iron family element, can satisfy the magnetic properties, particularly the magnetostriction required for the magnetic head. However, the known amorphous magnetic alloy material having the specified amount of iron also suffers from the drawbacks of high chemical wear and mechanical wear.

The present applicant has proposed in Japanese Patent Application No. 150966/1979 (Japanese Laid Open Patent Application No. 75542/1981) including predetermined quantity of a platinum family element into an amorphous magnetic alloy material, so as to decrease the chemical wear of the amorphous magnetic alloy material. The thus proposed amorphous magnetic alloy material exhibits a considerably great effect in decreasing the chemical wear under a normal operatng condition of the magnetic head. However, in a case where magnetic heads are stored at a considerably high temperature and humidity condition over a long period of time, a film is formed on the surface of the amorphous magnetic alloy material and is discolored under the influence of moisture. As a result, the signal loss at the spacing between the magnetic head and tape is increased. In addition, the input and output levels at a high frequency decrease when the magnetic heads with the film are subsequently used for recording or regenerating. When the magnetic heads with the film are subsequently brought into a sliding contact with the tape, a part of the film, particularly in the neighbourhood of the head gap, is peeled off, with the consequence that the effective gap is increased or a loading is caused to occur in the gap. Furthermore, in a case where recording and regenerating are conducted under a severe condition of considerably high temperature and humidity, chemical wear is conspicuously increased when the magnetic heads are slid against the tape.

It is known from Zairyo Kagaku (Material Science) 15(4), 1978, p207 that, in order to enhance the corrosion resistance of an amorphous magnetic alloy material, chromium is incorporated into this material. It is also known from a report from MR79-14 (1979) by the Institute of Electronics and Communication Engineers of Japan, Researching Association of Magnetic Recording, to include chromium into an amorphous magnetic alloy material for the magnetic head. When such a material is used as a component material of a magnetic head, the fact that the magnetic head is stored or retained in a severe condition for a long period of time does not seriously cause the inconveniencies to appear at the recording and regenerating. However, according to research by the present inventors, it has been clarified that the chemical wear of the amorphous magnetic alloy material with chromium used as a component material of the magnetic head, is considerably large under a high temperature and humidity condition and even under normal temperature and humidity conditions.

It is a principal object of the present invention to discover a novel composition of an amorphous magnetic alloy material particularly suited for the component of a magnetic head and also to provide a magnetic head with a long life and small deterioration of the properties. When the novel alloy composition is used as the component of a magnetic head, it should exhibit a small chemical wear even under a severe condition of sliding contact with the tape. In addition, the novel alloy composition should not deteriorate, even when magnetic heads are stored under severe conditions.

The present inventors, who conducted much research for the purpose of achieving the object mentioned above, discovered that the object is achieved by incorporating predetermined amounts of a platinum family element and chromium into a cobalt based amorphous magnetic alloy material with a small iron content. The present invention is completed as a result of this discovery.

The amorphous magnetic alloy material of the present invention contains at least iron and cobalt as the iron family element, the quantity of iron in terms of atomic proportion based on the iron family element being from about 4 to 7%, and further contains, according to a feature of the present invention, from about 0.0% to 8 atomic % of at least one platinum family element and from about 0.5 to 8 atomic % of chromium.

The present invention is explained hereinafter in detail with regard to the embodiments thereof.

Figure 1:
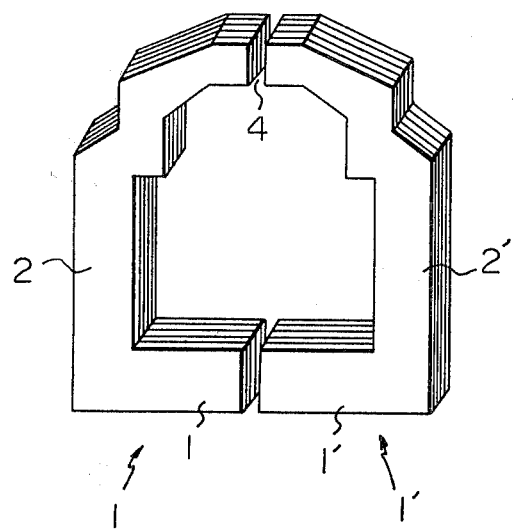
FIG. 1 depicts a core body from the alloy of the invention.

The essential components of the amorphous magnetic alloy material according to the present invention are iron, cobalt, a platinum family element and chromium. The components other than these essential components may be any ones which are contained in a known amorphous magnetic alloy material used for the core of a magnetic head. The composition of an amorphous magnetic alloy material for the core of a magnetic head is known in U.S. Pat. No. 4,079,430 and 4,188,211 assigned to TDK Electronics Co., Ltd.

The iron family elements are iron and cobalt, or iron, cobalt and nickel. The quantity of iron in terms of atomic proportion or percent based on the iron family element, should be from about 4 to 7%, so that the magnetostriction can be kept as low as possible.

The vitrification element, which is necessarily contained in the amorphous alloy and which may also be referred to as the metalloid element, is preferably contained in the amorphous alloy material of the present invention in an amount of from about 20 to 26 atomic %, from the view point of satisfactory magnetic properties and amorphous degree. The vitrification element of the amorphous magnetic alloy material according to the present invention may be any known element.

The amorphous magnetic alloy material according to the present invention is expressed by the formula of:

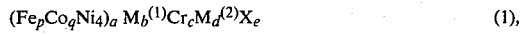

$$(Fe_p Co_q Ni_4)_a M_b^{(1)} Cr_c M_d^{(2)} X_e \qquad (1),$$

wherein $M^{(1)}$ is at least one platinum family element, $M^{(2)}$ is at least one transition metal element other than the iron and platinum family elements and chromium, and X is at least one vitrification element. In addition, the paraments p, q, r, a, b, c, d and e fulfill the following relationships. p+q+r=100%; p=about 4 to 7%; r=0 to about 10%; a+b+c+d+e=100 atomic %; b=about 0.01 to 8 atomic %; c=about 0.5 to 8 atomic %; d=0 to about 4 atomic %, and; e=20 to about 26 atomic %.

At least one platinum family element $M^{(1)}$ is preferably at least one element selected from the group consisting of ruthenium (Ru), palladium (Pd), platinum (Pt), iridium (Ir) and rhodium (Rh) and more preferably includes ruthenium as the essential element or ruthenium alone.

The transition metal element $M^{(2)}$ is at least one element of the first, second and third transition series in a broad sense, namely from Sc to Zn, from Y to Cd and from La to Hg of the long period table, respectively except for the iron-and platinum-family elements and chromium.

The vitrification element X is at least one of silicon (Si), boron (B), phosphorus (P), carbon (C), germanium (Ge), tin (Sn), gallium (Ga), indium (In), atimony (Sb), aluminum (Al) and the like. The vitrification element X may therefore occasionally be expressed by the formula of $Si_k B_e X^{(1)}_m$ which is a preferable vitrification element. In the formula of $Si_k B_l X^{(1)}_m$, k+l+m=100, k=5 to 20% and m=0 to 20%, and also $X^{(1)}$ is at least one element selected from the group consisting of phosphorus (P), germanium (Ge), tin (Sn) and carbon (C).

The composition of the amorphous magnetic alloy material according to the present invention is further explained with regard to the desirable properties of the material.

The atomic % "a" of the iron family element(s) ranges from 79.49 to 54% because of the formula a=100−(b+c+d), and the parameter "p", which represents the iron atomic percentage in the iron family element, is from about 4 to 7%. These atomic percentages of the iron family element and the iron itself provide the amorphous magnetic alloy material with a satisfactorily low magnetostriction. The iron family element may contain nickel, as described above. However, since the saturation magnetic flux density decrease with the increase in the nickel content, the parameter "r", which represents the nickel atomic percentage in the iron family element, should not be more than about 10%.

The parameter "e", which represents the atomic percentage of the vitrification element, ranges from about 20 to 26 atomic %. When the vitrification element exceeds about 26%, a satisfactory saturation magnetic flux density cannot be obtained. On the other hand, when the vitrification element is smaller than about 20%, the crystallization temperature Tx is too low to use the amorphous magnetic alloy material for actual purposes. As stated hereinabove, a preferable vitrification element X is $Si_k B_l X_m^{(1)}$, wherein k ranges from about 5 to 20%, m ranges from 0 to 20%, and $X^{(1)}$ is at least one of P, Ge, Sn and C. When k is less than 5% (K<5%) and more than 20% (K>20%), a satisfactory saturation magnetic flux density cannot be obtained. In addition, when m is more than 20% (m>20%), it is difficult to vitrify the corresponding alloy material.

When the parameter "e", which represents the atomic percentage of the vitrification element, is from 20 to 26%, the crystallization temperature Tx is higher than the Curie temperature Tc, and thus an internal-stress relief heat treatment can easily be carried out.

The parameter "b", which represents the atomic percentage of at least one platinum family element, ranges from about 0.1 to 8 atomic %, as described hereinabove. When the amount of at least one platinum family element is less than about 0.01 atomic %, the effects of the present invention cannot be realized appreciably. On the other hand, when the amount of at least one platinum family element is more than about 8%, it is difficult to vitrify the corresponding alloy material. The parameter "b" is preferably from about 0.5 to 6 atomic %.

The parameter "c", which represents the atomic % of the chromium, ranges from about 0.5 to 8 atomic %, as described above. When the amount of chromium is less than 0.5 atomic %, the effects of the present invention cannot be realized appreciably. On the other hand, when the amount of chromium exceeds about 8%, the Curie temperature Tc is decreased to less than approximately 100° C., with the consequence that satisfactory magnetic properties cannot be obtained. The parameter "c" is preferably from about 1 to 5%.

The amorphous magnetic alloy material may additionally contain up to about 4 atomic % of at least one transition metal element which is expressed in the above mentioned formula (1) as $M^{(2)}$. When the parameter "d", which represents the atomic percentage of the element $M^{(2)}$, exceeds about 4 atomic %, the effects of the present invention are impaired.

A preferable amorphous magnetic alloy material according to the present invention further contains, in addition to chromium and at least one platinum family element, at least one of the $IV_B$ family element (Ti, Zr and Hf), the $V_B$ family element (V, Nb and Ta) and/or the $VI_B$ family element except for chromium (Mo and W). This material can be easily vitrified and easily formed as a sheet, and also provides the sheet with excellent surface roughness. Preferable $IV_B$, $V_B$ and $VI_B$ (except for Cr) elements are, for example, Nb, Ta, Ti, Zr, V, W and Mo. Preferably, from one to five of these elements are contained in the amorphous magnetic alloy material in an amount of from about 0.05 to 4 atomic % and especially from about 0.08 to 3 atomic %. More particularly, the $IV_B$, $V_B$ and $VI_B$ (except for Cr) elements are Ti, V and Mo, respectively, which are contained alone or in combination in the amorphous magnetic alloy material. These three elements can enhance the production yield of the amorphous material sheet with a small surface roughness, as compared with Nb, Ta, Zr and W. In addition, these three elements are effective for further decreasing the chemical wear under a severe sliding condition of the tape and also for mitigating the deterioration of a magnetic head in severe conditions. Furthermore, the crystallization temperature is enhanced by these three elements, and thus a stress-relief heat treatment can be easly carried out, which contributes to the production of a magnetic head.

Preferable amorphous magnetic alloy materials explained above have the formula (1), except that $M_d^{(2)}$ in the formula (1) is expressed by $M_f^{(3)} M_g^{(4)}$, wherein f+g=d, f is from about 0.05 to 4 atomic %, preferably from about 0.08 to 3 atomic %, and the $M^{(3)}$ and $M^{(4)}$ elements are as follows.

The $M^{(3)}$ element(s) is at least one of the $IV_B$, $V_B$ and $VI_B$ (except for Cr) elements, preferably selected from the group consisting of Nb, Ta, Ti, Zr, V, W an Mo, more preferably selected fromt the group consisting of Ti, V and Mo. The $M^{(4)}$ element(s) is a transition metal element in abroad sense except for the iron, platinum, $IV_B$, $V_B$ and $VI_B$ family elements.

The amorphous magnetic alloy materials described hereinabove according to the present invention are in an amorphous state having substantially no long range order. These materials may be in the form of a thin film, a fine wire and the like, but are usually in the form of a thin sheet having a thickness of from approximately 10 to 100 μm (microns).

Processes for producing the amorphous magnetic alloy material of the present invention will now be described. An alloy in the gaseous or liquid state having a composition corresponding to that of the final product is super quenched from such state to a solid state. The super quenching method may be a sputtering, which allows a thin film to be formed on a substrate, but is usually a solidification method of an alloy melt, wherein the alloy melt is super quenched at a rate of $10^{4°}$ C./sec or higher, usually from $10^{4°}$ to $10^{6°}$ C./sec, thereby solidifying the alloy melt and producing a thin sheet of an amorphous alloy. In order to super quench the alloy in a molten state, the alloy melt may be sprayed from a nozzle and then rapidly cooled by one of various known rapid-cooling methods, such as a twin roll method, a single roll method or a centrifugal rapid-cooling method.

A usual process for manufacturing a magnetic head using sheets of an amorphous magnetic alloy material according to the present invention will now be described. First, the sheets are subjected to a heat treatment which may be: an annealing intended to relieve the internal stress of the sheets and carried out under no magnetic field at a temperature lower than the crystallization temperature and higher than the Curie temperature, or; an annealing under a magnetic field intended to relieve the internal stress and improve the magnetic properties of the sheets. Such a heat treatment is not indispensable, but is preferable. The annealing under a magnetic field may be the one using a stationary or a revolving magnetic field. The kind and condition of the annealing heat treatments may be optionally selected, taking into consideration of the composition and desired magnetic properties of an amorphous magnetic alloy material.

After the heat treatment, a number of the sheets made of an amorphous magnetic alloy material are laminated by means of an insulating binder, so as to obtain a laminate block with a predetermined thickness which is then subjected to a grinding thereby manufacturing halves of the core of a magnetic head. Alternately, an individual sheet may be shaped into the predetermined form by blanking, photoetching and the like, and, subsequently, a plurality of these sheets are laminated by means of an insulating binder in such a manner to obtain the halves of core body of a magnetic head with a predetermined tracking width.

Subsequently, a coil is provided on each half of the core body and is then installed in a core holder. After polishing the end of the core halves to be confronted with one another, the core halves are assembled to manufacture a core body and an insert material is located in the gap. The core body is then mounted in a shield case and a magnetic head is then completed by a resin molding.

The magnetic head manufactured as described above may be a contact type or a non-contact type, in which the magnetic head is instantaneously in contact with a recording medium. The magnetic head can be used very conveniently in any audio or video recorder, computer, card reader and the like.

The amorphous magnetic alloy material of the present invention is highly corrosion resistant due to the combination of chromium and platinum family element(s), and, the inconveniences in a magnetic head, due to chemical wear, can be prevented even where the magnetic head is operated or stored in a considerably severe condition.

The amorphous magnetic alloy material according to the present invention can be advantageously mounted in the magnetic head case made of a conventional material, which reason is explained hereinafter. In the magnetic head, the core body, which is enclosed in a case, is grounded through the conduction via the case. This is to prevent the noise which is caused by the static electricity generated by the contact of the magnetic head with the tape and charged in the magnetic head. The charges of static electricity are conducted from the magnetic head to the ground via the case. The electric potential of a conventional amorphous magnetic alloy material based on cobalt is expresed in terms of:

$$Co \rightleftarrows Co^{2+} + 2e^- \quad E_0 = -0.277 \text{ (mV)}.$$

On the other hand, the electric potential of Permalloy, which is a conventional case material, is expressed in terms of:

$$Ni \rightleftarrows Ni^{2+} + 2e^- \quad E_0 = -0.230 \text{ (mV)}.$$

Therefore, a local cell is established between the core body, which is less noble and thus anodically behaves, and the case, which is noble and thus cathodically behaves. The core body is appreciably dissolved due to the anodic reaction, when the ambient media have high temperature and high humidity. The proposal of the present invention, namely the incorporation of at least one platinum element to the cobalt based amorphous magnetic alloy material, is to enhance the electric potential of such a material. The electric potential of ruthenium is expressed in terms of:

$$Ru \rightleftarrows Ru^{2+} + 2e^-, \quad E_0 = 0.455 \text{ (mV)},$$

and, thus, the ruthenium is a noble element and enhances the electric potential of the cobalt based material.

The chromium, which is contained in the amorphous magnetic alloy material of the present invention, is an element which contributes to the formation of a passivation film and thus enhances the corrosion resistance. The reaction of chromium to form the passivation film seems to be as follows.

$$Cr + 2H_2O \rightleftarrows Cr(OH)_2 + H_2$$

Accordingly, the corrosion resistance of the amorphous magnetic alloy material under a high temperature and moisture condition is improved by both the passivation and noble states of the material.

The present invention is hereinafter explained by way of the Examples.

EXAMPLE 1

Table 1, below, indicates the prepared amorphous magnetic alloy materials having the formula of $(Fe_{5.5}Co_{94.5})_{76-b-c}Ru_bCr_c(Si_{10}B_{90})_{24}$, wherein the parameters b and c are varied, as given in Table 1. Every raw material having a purity of 99.9% or higher was weighted to obtain the above composition and melted in a Tammann furance under an argon gas stream. Upon melting, the obtained alloy melt was sucked into a quartz tube and rapidly cooled in the quartz tube. Thirteen master alloys were prepared accordingly.

Subsequently, these master alloys were melted and the super quenched by a single roll method at a rate of approximately $10^6$° C./sec, so that thirteen thin sheets in the form of a strip having a thickness of 30 μm were formed. These sheets were subjected to an X-ray diffraction and an electron diffraction. As a result, a diffraction pattern indicating a crystal structure was not detected at all.

The sheets mentioned above were subjected to an annealing at a temperature higher than the Curie point and lower than the crystallization temperature in an argon atmosphere, while the annealing the thin sheets were not placed in the magnetic field.

An epoxy adhesive was prepared using the main agent, which is a mixture of a epichlorohydrin-bisphenol A type epoxy resin having a molecular weight of about 3000 with an ethyl cellosolve, and a curing agent, which is a mixture of dicyandiamide with acetone. In the prepared epoxy adhesive, the weight proportion of the epoxy resin to dicyandiamide was 100:30.

Subsequently, the epoxy adhesive was applied by a spray gun over one side of the eighteen thin sheets of every alloy material, laminated to each other, and tack bonded to each other with a jig. These pieces were preliminarily dried at 90° C. for 20 minutes. These pieces were then pressed by a bonding jeg at a pressure of 1 t/cm² so as to remove excessive adhesive and, while being pressed, they were heated at 150° C. for 5 hours, followed by unforced cooling. As a result, a 0.6 mm thick laminate block was obtained. The laminate block was ground, so that halves 1,1' of a core body, as shown in FIG. 1, where obtained.

A fine wire was wound around each core half 1,1' at the section indicated by the reference numeral 2,2' and the core halves 1,1' were accomodated in a core holder (not shown). The confronting surfaces of the core halves 1,1' defining the effective gap 4 of a magnetic head were mirror finished by grinding and then polishing, while the core halves 1,1' were held in the core holders. The core halves 1,1' were butted with or confronted to one another with predetermined spaces inbetween according to a conventional method.

The above procedure was conducted using thirteen thin sheets, so that the thirteen magnetic heads Nos. 1-1 to 1-13 given in Table 1 were manufactured.

With regard to the so-obtained thirteen magnetic heads, the chemical wear amount of the magnetic heads was measured under conditions frequently encountered in the operation of magnetic heads. The magnetic tape used in the measurement was of a γ-Fe₂O₃ coating type and the binder of the coating layer comprised a vinyl chloride acetate thermoplastic resin. This magnetic tape was brought into contact with and displaced relative to the magnetic head, while the pressure of 20 g, which is a normal pressure in a casette tape, was applied to the magnetic tape. The displacement was carried out with the tape running at a speed of 4.75 cm/sec and under the environmental condition of 25° C. and relative humidity of 50%. After running over a period of 1000 hours, the worn depth of the front surface of the magnetic heads was measured by means of a surface roughness tester. The measurement results of the thirteen magnetic heads were reduced to the wear depth per 100 hours of running and given in Table 1.

The worn surface of the magnetic heads after running 100 hours was measured by means of an optic microscope. The worn surface of the magnetic heads Nos. 1-3 through 1-13 did not exhibit a mirror surface, and only scratches were observed. This fact indicates that the magnetic heads Nos. 1-3 through 1-13 were worn out only mechanically. Contrary to this, the magnetic heads Nos. 1-1 and 1-2 exhibited a mirror surface with metallic lustre, which indicates that chemical wear greater than mechanical wear took place during the running of the magnetic tape.

In addition to the above measurement, thirteen magnetic heads were protractedly exposed under the condition of 70° C. and relative humidity of 95% over the period of 200 hours, so as to test the storing property under inferior and severe condition. Subsequently, the magnetic heads were brought into contact with the running magnetic tape mentioned above and a regenerating sensitivity at 14 KHz was measured and then compared with the output level of the magnetic heads before the protracted exposure. The obtained changes in the output levels are given in Table 1.

Furthermore, the magnetic tape was run with respect to the magnetic heads under a severe and inferior condition, so as to evaluate the chemical wear under such conditions. The running of the tape over the period of 1000 hours described hereinabove was carried out under a condition of 40° C. and relative fumidity of 95%, and the wear depth of the front surface of the magnetic heads was measured by means of a surface roughness tester. The measurement results of the thirteen magnetic heads are reduced to the wear depth per 100 hours and are given in Table 1. Similarly to the results under the frequently encountered condition, chemical wear and mechanical wear are the predominant reasons which caused the wear of the magnetic heads Nos. 1-1, 1-2 and Nos. 1-3 through 1-13.

It will be understood from the results of Table 1 that, only by incorporating predetermined amounts of Cr and a platinum family element into an amorphous magnetic alloy material, can this material exhibit an excellent corrosion resistance under the severe and inferior conditions of running and storing.

EXAMPLE 2

The magnetic heads Nos. 2-1 through 2-10 and Nos. 3-1 through 3-7 were manufactured by using the seventeen amorphous magnetic alloy materials given in Tables 2 and 3 and according to the procedure of Example 1. The running of the magnetic tape and measurement of the wear depth were carried out as in Example 1. However, the running of the magnetic tape was carried out only under the condition of 40° C. and relative humidity of 95%. In Tables 2 and 3 the wear depth reduced to that per 100 hours is given. Incidentally, the numerals directly before the platinum family, $IV_B$-, $V_B$- and $V_B$-family elements, are the atomic percentage of the corresponding elements.

It will be understood from the results given in Tables 2 and 3 that all magnetic heads using the amorphous magnetic alloy compositions of the present invention are highly wear resistant under severe and inferior conditions.

TABLE 2

| Magnetic Heads (Nos) | Composition | Wear Depth after Running of Tape at 40° C. 95% RH ($\mu$m/100 hrs) |
|---|---|---|
| 2-1 | $(Fe_{5.6}Co_{94.4})_{69.5}4Ru4Cr(Si_{10}B_{90})_{22.5}$ | 0.2 |
| 2-2 | $(Fe_{5.6}Co_{89.4}Ni_5)_{70}4Ru4Cr(Si_{15}B_{85})_{22.0}$ | 0.3 |
| 2-3 | $(Fe_{5.6}Co_{84.4}Ni_{10})_{71.5}4Ru4Cr(Si_{30}B_{70})_{21.5}$ | 0.5 |
| 2-4 | $(Fe_{5.6}Co_{79.4}Ni_{10})_{71}4Ru4Cr(Si_{80}B_{20})_{21}$ | 0.6 |
| 2-5 | $(Fe_{5.6}Co_{94.4})_{67}4Ru4Cr(Si_{10}B_{90})_{25}$ | 0.4 |
| 2-6 | $(Fe_{5.6}Co_{94.4})_{69.5}4Ru2Cr(Si_{10}B_{86}P_4)_{24.5}$ | 0.8 |
| 2-7 | $(Fe_{5.6}Co_{94.4})_{69.5}4Pd3Cr(Si_{10}B_{90})_{23.5}$ | 1.2 |
| 2-8 | $(Fe_{5.6}Co_{94.4})_{69.5}4Pt3Cr(Si_{10}B_{90})_{23.5}$ | 1.0 |
| 2-9 | $(Fe_{5.6}Co_{94.4})_{69.5}4Rh3Cr(Si_{10}B_{90})_{23.5}$ | 0.8 |
| 2-10 | $(Fe_{5.6}Co_{94.4})_{69.5}4Ir3Cr(Si_{10}B_{90})_{23.5}$ | 0.9 |

TABLE 1

| Magnetic Heads (Nos.) | Composition $(Fe_{5.5}Co_{94.5})_{76-b-c}Ru_bCr_c(Si_{10}B_{90})_{24}$ | | Wear Depth after Running of Tape at 25° C., 50% RH ($\mu$m/100 hrs) | Changes in Output Levels at 14 KHz after storing at 40° C., 95% RH 200 hrs (dB) | Wear Depth after running of Tape at 40° C., 95% RH ($\mu$m/100 hrs) |
|---|---|---|---|---|---|
| | b (at %) | c (at %) | | | |
| 1-1 | 0 | 0 | 15 | −3 | 20 |
| 1-2 | 0 | 4 | 12 | −0.5 | 15 |
| 1-3 | 0.05 | 4 | 1.0 | ±0 | 1.0 |
| 1-4 | 1 | 4 | 0.5 | ±0 | 1.0 |
| 1-5 | 2 | 4 | 0.3 | ±0 | 0.5 |
| 1-6 | 4 | 4 | 0.1 | ±0 | 0.2 |
| 1-7 | 6 | 4 | 0 | ±0 | 0 |
| 1-8 | 4 | 0 | 0.1 | −1.5 | 2.0 |
| 1-9 | 4 | 0.5 | 0.1 | −0.5 | 0.3 |
| 1-10 | 4 | 1 | 0.1 | ±0 | 0.2 |
| 1-11 | 4 | 2 | 0.1 | ±0 | 0.2 |
| 1-12 | 4 | 6 | 0.1 | ±0 | 0.2 |
| 1-13 | 4 | 8 | 0.1 | ±0 | 0.2 |

TABLE 3

| Magnetic Heads (Nos) | Composition | Wear Depth after Running of Tapes at 40° C. 95% RH ($\mu$m/100 hrs) |
|---|---|---|
| 3-1 | $(Fe_{5.6}Co_{94.4})_{70}4Ru2Cr(Si_{10}B_{90})_{23.5}0.5Ti$ | 0.1 |
| 3-2 | $(Fe_{4.6}Co_{95.4})_{70}4Ru2Cr(Si_{10}B_{90})_{23.5}0.5Mo$ | 0.2 |
| 3-3 | $(Fe_{5.6}Co_{94.4})_{70}4Ru2Cr(Si_{10}B_{90})_{23.5}0.5V$ | 0.2 |
| 3-4 | $(Fe_{5.6}Co_{94.4})_{70}4Ru2Cr(Si_{10}B_{90})_{23.5}0.5W$ | 0.6 |
| 3-5 | $(Fe_{6.6}Co_{93.4})_{70}4Ru2Cr(Si_{10}B_{90})_{23.5}0.5Ta$ | 0.8 |
| 3-6 | $(Fe_{5.6}Co_{94.4})_{70}4Ru2Cr(Si_{10}B_{90})_{23.5}0.5Nb$ | 0.7 |
| 3-7 | $(Fe_{5.6}Co_{94.4})_{69}4Ru2Cr(Si_{10}B_{90})_{23.5}05Ti0.5Mo$ | 0.1 |

EXAMPLE 3

The magnetic properties of the Samples Nos. 1-1, 1-5 and 1-7 given in Table 1 were measured and the results were as follows.

| Sample No. | Saturation Magnetic Flux Density Bs (KG) | Coercive Force Hc (mOe) | Initial Permeability $\mu_i$ (—) |
|---|---|---|---|
| 1-1 | 9.0 | 25 | 6000 |
| 1-5 | 8.0 | 14 | 15000 |
| 1-7 | 7.5 | 10 | 20000 |

We claim:

1. An amorphous magnetic alloy material having a high resistance against deterioration when stored for a long period of time at a high temperature and high humidity and having a high wear resistance, wherein said amorphous magnetic alloy material is expressed by the formula:

$$(Fe_pCo_qNi_r)_a M_b^{(1)} Cr_c M_d^{(2)} X_e$$

wherein $M^{(1)}$ is ruthenium alone or combined with at least one platinum family element selected from the group consisting of palladium, platinum, iridium, and rhodium, $M^{(2)}$ is at least one transition metal element other than iron, cobalt, nickel, ruthenium, palladium, platinum, iridium, rhodium, and chromium, and X is at least one vitrification element with the proviso that the parameters p, q, r, a, b, c, d, and e fulfill the following relationships: p+q+r=100%, p=about 4% to 7%; r=0% to about 10%, a+b+c+d+e=100 atomic %; b=about 0.01 to 8 atomic %; c=about 0.5 to 8 atomic %; d=0 to about 4 atomic %; and e=20 to about 26 atomic %.

2. The amorphous magnetic alloy material according to claim 1, wherein said platinum family element is selected from the group consisting of, iridium and rhodium.

3. The amorphous magnetic alloy material according to claim 1, wherein $M^{(1)}$ is ruthenium alone.

4. The amorphous magnetic alloy material according to claim 1, wherein said vitrification element is at least one selected from the group consisting of silicon, boron, phosphorus, carbon, germanium, tin, gallium, indium, antimony, and aluminum.

5. The amorphous magnetic alloy material according to claim 4, wherein said vitrification element is expressed by the formula of $Si_k B X_m^{(1)}$, wherein k+l+m=100, k=5% to 20% m=0 to 20%, and $X^{(1)}$ is at least one element selected from the group consisting of phosphorus, germanium, tin, and carbon.

6. The amorphous magnetic alloy material according to claim 1, 4, or 5, further containing at least one Group $IV_B$ element, at least one Group $V_B$ element, and at least one Group $VI_B$ element, except for chromium, in an amount of from 0.05 to 4 atomic %.

7. The amorphous magnetic alloy material according to claim 6, wherein said Group $IV_B$ element is at least one selected from the group consisting of titanium, zirconium, and hafnium.

8. The amorphous magnetic alloy material according to claim 7, wherein said Group $IV_B$ element is titanium.

9. The amorphous magnetic alloy material according to claim 7, wherein said Group $V_B$ element is at least one selected from the group consisting of vanadium, niobium, and tantalum.

10. The amorphous magnetic alloy material according to claim 9, wherein said Group $V_B$ element is vanadium.

11. The amorphous magnetic alloy material according to claim 6, wherein said Group $V_B$ element is at least one selected from the group consisting of molybdenum and tungsten.

12. The amorphous magnetic alloy material according to claim 11, wherein said Group $V_B$ element is molybdenum.

13. A magnetic head having excellent resistance to chemical and mechanical wear comprising a core consisting of an amorphous magnetic alloy material having a high resistance against deterioration when stored for a long period of time at a high temperature and high humidity and having a high wear resistance wherein said amorphous magnetic alloy material is expressed by the formula:

$$(Fe_pCo_qNi_r)_a M_b^{(1)} Cr_c M_d^{(2)} X_e$$

wherein $M^{(1)}$ is ruthenium alone or combined with at least one platinum family element selected from the group consisting of palladium, platinum, iridium, and rhodium, $M^{(2)}$ is at least one transition metal element other than iron, cobalt, nickel, ruthenium, palladium, platinum, iridium, rhodium, and chromium, and X is at least one vitrification element, with the proviso that the parameters p, q, r, a, b, c, d, and e fulfill the following relationships: p+q+r=100%; p=about 4% to 7%; r+0% to about 10%; a+b+c+d+e=100 atomic %; b=about 0.01 to 8 atomic %; c=about 0.5 to 8 atomic %; d=0 to about 4 atomic %; and e=20 to about 26 atomic %.

* * * * *